(12) United States Patent
Chiu et al.

(10) Patent No.: US 6,522,428 B1
(45) Date of Patent: Feb. 18, 2003

(54) STRUCTURE OF FOLDABLE OPTICAL PATH

(75) Inventors: Chui-Kuei Chiu, Hsinchu Hsien (TW); Yin-Chun Huang, Hsinchu (TW)

(73) Assignee: Umax Data Systems, Inc., Hsinchu (TW)

( * ) Notice: Subject to any disclaimer, the term of this patent is extended or adjusted under 35 U.S.C. 154(b) by 0 days.

(21) Appl. No.: 10/064,003

(22) Filed: Jun. 4, 2002

(51) Int. Cl.⁷ ............................................. G02B 26/08
(52) U.S. Cl. .................... 358/196; 359/212; 359/215; 358/483
(58) Field of Search ................... 359/196–201, 359/212–215, 220–226; 250/234–236; 235/462.41–462.45, 462.49, 472.01; 358/474, 482–483, 493–497

(56) References Cited

U.S. PATENT DOCUMENTS 5,353,360 A  * 10/1994  Obara .......................... 382/65

* cited by examiner

*Primary Examiner*—James Phan
(74) *Attorney, Agent, or Firm*—Jinaq Chyun Intellectual Property Office

(57) ABSTRACT

A structure of foldable optical path is suitable for use in an optical scanner with a CCD type or a type of non-contact imaging sensor. The structure of foldable optical path arranges a part of the optical path in a foldable packing device, thus the scanner is able to utilize normal lens with better depth of field and makes the scanner more compact for the convenience of operation and carrying.

18 Claims, 7 Drawing Sheets

STRUCTURE OF FOLDABLE OPTICAL PATH

BACKGROUND OF INVENTION

1. Field of Invention

The present invention relates to a structure of foldable optical path. More particularly, the present invention relates to a structure of foldable optical path inside the scanning module of a charge couple device (CCD) type optical scanner.

2. Description of Related Art

With the progress in multimedia technology, the improvement of processing of image data promoting the development of computer peripheral device such as scanner. From handheld monochrome type to present full color and high-resolution type, the scanner can produce a finer and vividly image. Today, a scanner is a widely used computer peripheral device for capturing document image and converting the document image to digital signals for computer process.

The optical system 100 of the conventional optical scanner as illustrated in FIG. 1 has a light source 110, a reflection mirror set 120, an image-formation set 130, and an optical sensor such as a charge couple device (CCD) 140. While performing scanning, light from the light source 110 is incident onto a document 300 putting on a light transmissible plate 200 to obtain an image light 310 by reflection or transmission. The reflection mirror set 120 comprises several reflection mirrors 121, 122, 123 and is located in an optical path of the image light 310. The image of document 300 on the light transmissible plate 200 is directed to the reflection mirror set 120 and reflected to the image-formation set 130, such as a lens set, by the reflection mirror set 120. The image-formation set 130 can receive the image light 310 of the document 300 transmitted by the reflection mirror set 120, focuses and projects the image light 310 onto the charge couple device 140. The above-mentioned is the optical path of the image light 310 of the document 300 transmitting in the optical system 100 of the optical scanner.

The charge couple device mentioned above transfers the light into photoelectric current by photoelectric transformation and saves the current in a storage electrode to convert into a signal charge, then converts the charge into different potential differences. The optical scanner utilizes these different potential differences to form the different bright and dark level, then displays the image by the gray scale light.

Furthermore, CCD is one kind of semi-conductor IC devices and manufactured by semi-conductor process. CCD's resolution won't be affected by the manufacture easily. However, the length of the CCD is much shorter than the width of normal documents or pictures, it needs to utilize a image-formation set to reduce the scale of the image when scanning, in order to scan the full image. Thus the size of the system will be larger, and it wastes time of fabricating and adjusting.

Contact image sensor (CIS) is another type of linear scanner commonly used for scanning an image or a document. The image or document is captured in an electronic format for ease of storage, display, processing and transmission. Due to a modular design, the CIS is easy to assemble, light, compact and costs less to produce. FIG. 2a is a front view of the scanning module of a conventional contact image sensor and FIG. 2b is a cross-sectional view of the scanning module. As shown in FIGS. 1a and 1b, a conventional contact image sensor (CIS) 400 consists of a linear light source 404, a self-focus lens array 401 and a sensing array 402 over a substrate board 403. The light source 404, the self-focus lens array 401, the sensing array 402 and the substrate board 403 are mounted on an aluminum frame 405. In a scanning operation, the self-focus lens array 401 reflects light coming from the original document 300 and forms an image on the sensing array 402. The sensing array 402 converts the color or the gray step level of a line of the document 300 into electronic signals. Throughout the scanning session, the scanning surface of the scanning module 400 in constant contacts with a document platform 210, and the document 300 is pulled forward or backward by a roller 500 for scanning.

The self-focus lens array 401 is constructed of a row of small-caliber radial gradient index lens, wherein the refractive index of each lens varies along the radial direction gradually, thus the lens are able to format a image. The whole lens array can format the image of one line of the original document on the sensing array in a ratio of 1:1. Compared with CCD which uses a normal image-formation set to format a image, the advantages of CIS which uses the self-focus lens array to format the image are the shorter optical path and the thinner and lighter applied system. However, the disadvantages of CIS are the depth of field is short, and the mechanical design and the control of the system need to be more precise than CCD.

As a conclusion, the advantages of the optical scanner which uses CIS are small-size and able to be portable, but its disadvantage is the depth of field is short, thus it's difficult to get a clear image when scanning a uneven document or picture. The advantages of the optical scanner which uses CCD is the longer depth of field, but its disadvantage is the mechanical design of the system can't be compact, thus it's not convenient to carry it. Moreover, since the document must be put on the light transmissible plate of the CCD type optical scanner while scanning, so it's not convenient in operation when scanning a thick book or large-size newspapers or magazines. Although some small-size flatbed scanners are able to put on a book or large-size newspapers or magazines to scan downward, but a user ought to hold the whole scanner during the scanning operation. Even the scanning result of the early-phase hand-held scanner is easy to be affected by operation cause it needs a user to push the scanner by hand to proceed the scanning operation.

SUMMARY OF INVENTION

Accordingly, one object of the present invention is to provide a structure of foldable optical path that can be use in the optical scanners of a CCD type or a type of non-contact imaging sensor. The structure of foldable optical path arranges part of the optical path in a foldable packing device, thus the scanner is able to utilize normal lens with better depth of field and makes the scanner more compact for the convenience of operation and carrying. A user doesn't have to push the scanner to proceed the scan operation. After the foldable packing device is folded, it's able to save the cost of package and storage because the volume of the scanner is decreased.

To achieve these and other advantages and in accordance with the purpose of the invention, as embodied and broadly described herein, the invention provides a structure of foldable optical path for an optical scanner. The optical scanner at least having a main frame, a light transmissible plate, a light source, a reflection mirror set, an image-formation set, and an optical sensor. The light source illuminates a document to get an image light. The reflection mirror set is arranged in an optical path of the image light to direct the image light to the optical sensor. The image-formation set is arranged in the optical path between the reflection mirror set and the optical sensor. The document contacts with the light transmissible plate during scanning. The structure of foldable optical path comprises as follows.

A foldable packing device is coupled to the main frame by a rotation pivot axis. The foldable packing device is able to rotate from a first position, at which the scanner is under a scanning operation, to a second position, at which the foldable packing device is folded via a pivot axis. Wherein the image-formation set and the optical sensor are disposed in the interior of the foldable packing device. While the foldable packing device is at the first position, the optical path of the image light will be directed into the interior of the foldable packing device through the image-formation set to the optical sensor. While the foldable packing device is at the second position, the image-formation set and the optical sensor diverge from the optical path of the image light.

The invention also provides an optical scanner for scanning a document. The optical scanner comprising: a main frame, a foldable packing device, a light source, a reflection mirror set, an optical sensor, and an image-formation set.

The main frame has a light transmissible plate, and the document contacts with the light transmissible plate. The foldable packing device connects to the main frame, and the foldable packing device is able to rotate from a first position which the scanner is during a scanning operation to a second position which the foldable packing device is folded via a pivot axis.

The light source is disposed in the interior of the main frame and illuminating the document to get an image light, wherein the image light has an optical path.

The reflection mirror set is disposed in the optical path and in the interior of the main frame, the reflection mirror set reflects the image light.

The optical sensor is disposed in the interior of the foldable packing device, while the foldable packing device is at the first position, the optical path of the image light will be directed into the interior of the foldable packing device to the optical sensor, while the foldable packing device is at the second position, the optical sensor diverges from the optical path of the image light.

The image-formation set is disposed in the interior of the foldable packing device, while the foldable packing device is at the first position, the optical path of the image light will be directed into the interior of the foldable packing device through the image-formation set to the optical sensor, while the foldable packing device is at the second position, the image-formation set diverges from the optical path of the image light.

The reflection mirror set has a plurality of reflection mirrors. The reflection mirror set is able to move in the interior of the main frame during the scanning operation, and distances between the reflection mirrors are adjustable. Thus a distance from the document to the image-formation set can be fixed. The optical scanner further includes a transmission member connecting to the reflection mirror set and drives the reflection mirror set moving in the interior of the main frame.

The reflection mirror set and the image-formation set are able to move in the interior of the main frame during the scanning operation. Thus the distance between the reflection mirror set and the image-formation set and the distance between the optical sensor and the image-formation set are adjustable in order to maintain the same magnification of the image light through the image-formation set to the optical sensor. The optical scanner further includes a transmission member connecting to the reflection mirror set and the image-formation set, and drives the reflection mirror set and the image-formation set moving in the interior of the main frame separately.

The optical scanner further includes a switch disposing near the pivot axis used to detect whether the foldable packing device is at the first position or not. Moreover, a calibration chart that disposing on the light transmissible plate used to calibrate the optical scanner while power is on.

One major aspect of this invention is the utilization of a foldable packing device for the convenience of carrying and operation. A user don't have to push the scanner to proceed the scanning operation.

Another aspect of this invention is deposing part of the optical path in the interior of the foldable packing device, and the foldable packing device is able to be folded to reduce the cost of the package and storage.

Another aspect of this invention is utilizing of a CCD that collocates with a normal image-formation set to get a better depth of field.

Another aspect of this invention is deposing a switch near the pivot axis to detect the position of the foldable packing device and prevent the foldable packing device from being folded during the scanning operation or check whether the foldable is at the right position or not.

It is to be understood that both the foregoing general description and the following detailed description are exemplary, and are intended to provide further explanation of the invention as claimed.

BRIEF DESCRIPTION OF DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DETAILED DESCRIPTION

Figure 1:
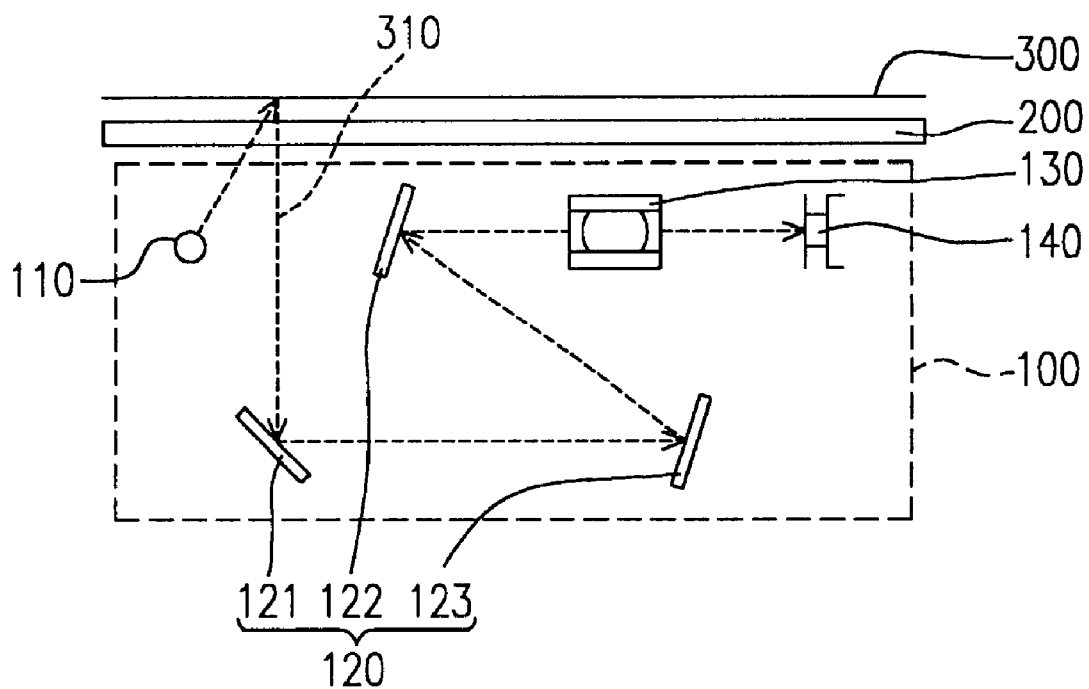
FIG. 1 illustrates the optical path of a conventional optical scanner.
Figure 2A:
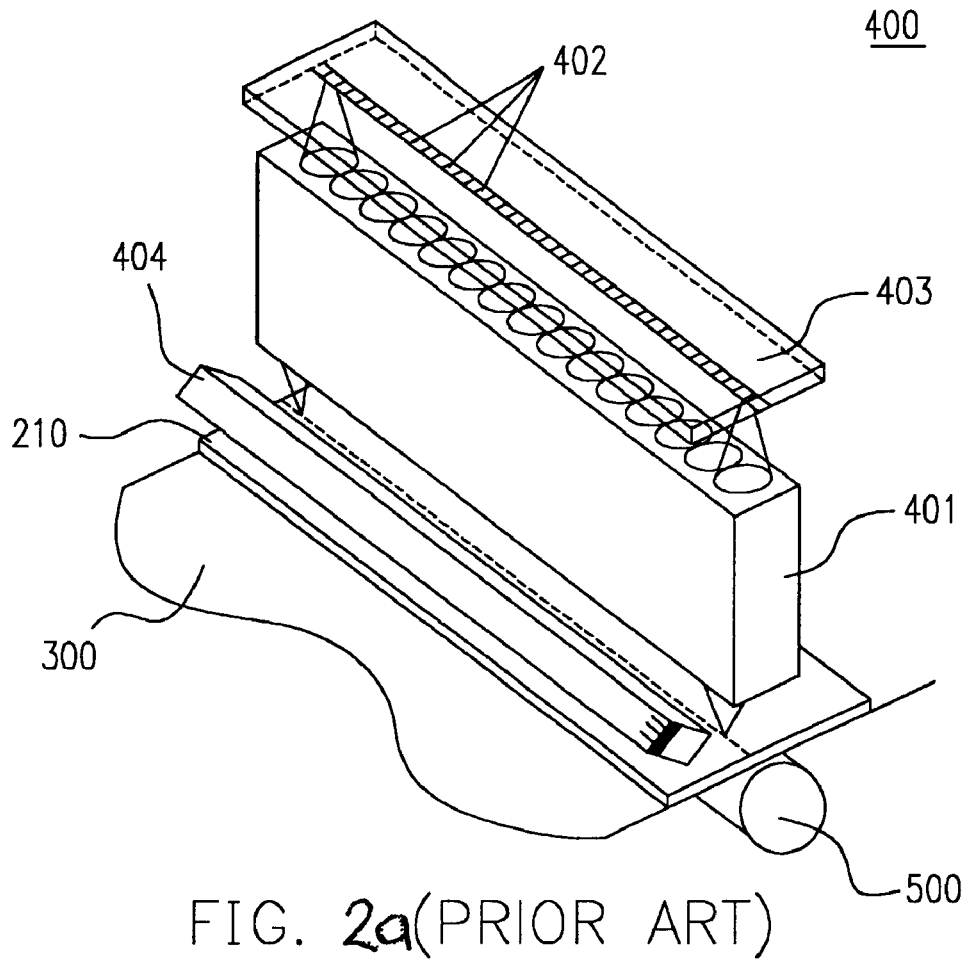
FIG. 2a is a perspective view showing the conventional CIS.
Figure 2B:
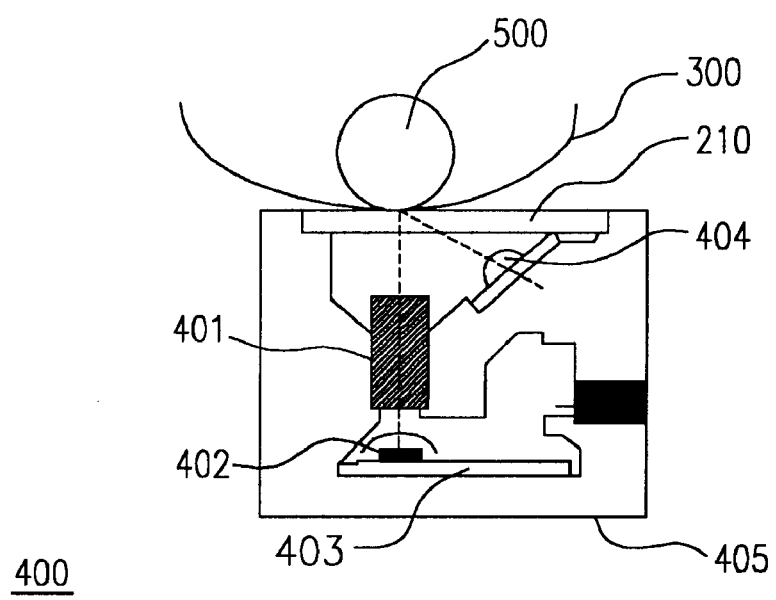
FIG. 2b is a cross-sectional view of the conventional CIS.

Reference will now be made in detail to the present preferred embodiments of the invention, examples of which are illustrated in the accompanying drawings. Wherever possible, the same reference numbers are used in the drawings and the description to refer to the same or like parts.

Figure 3A:
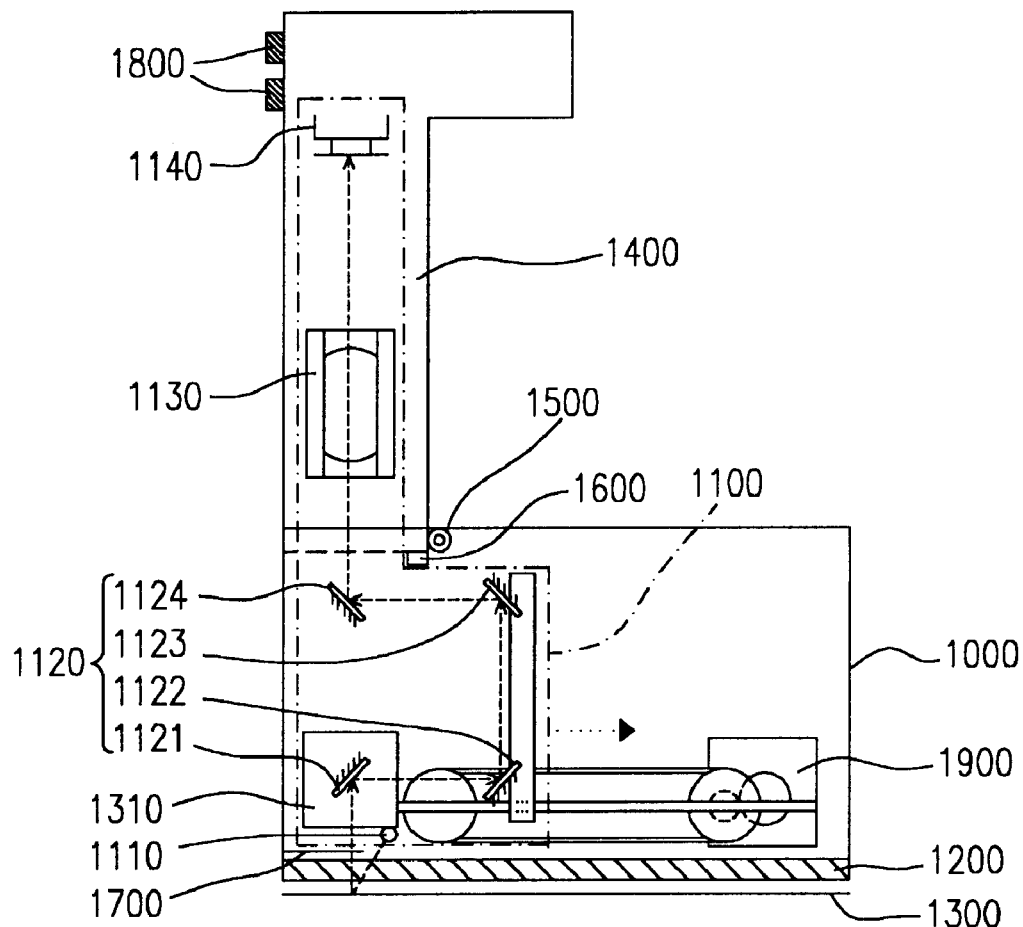
FIG. 3a is a cross-sectional view of the structure of foldable optical path while the scanner in a scanning operation according to an embodiment of this invention.

FIG. 3a is a cross-sectional view showing the components of the structure of foldable optical path in a foldable packing device, according to an embodiment of this invention. As shown in FIG. 3a, the optical scanner includes a main frame 1000 and a foldable packing device 1400 that can serve like a handle for holding during scanning operation. That is to say, the optical scanner of the present invention is a hand-held scanner. In a scanning operation, a user holds the foldable packing device 1400 and presses the light transmissible plate 1200 onto the document 1300, then selects the appropriate function keys 1800 (e.g. "scan" function key, "OCR" function key, or "copy" function key) deposing on the foldable packing device 1400 to proceed the scanning operation.

Figure 3B:
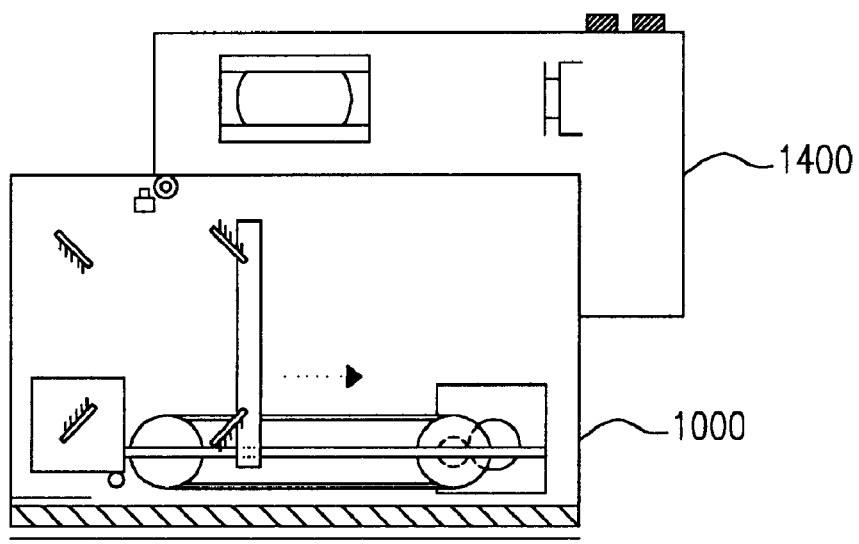
FIG. 3b is a cross-sectional view of the structure of foldable optical path while the foldable packing device is folded according to an embodiment of this invention.

The foldable packing device 1400 is coupled to the main frame 1000 via a pivot axis 1500, and is able to move from a first position that is suitable to proceed a scanning operation (as shown in FIG. 3a) to a second position that the foldable packing device 1400 is folded (as shown in FIG. 3b) by rotating. A switch 1600 which is able to detect the position of the foldable packing device 1400 is deposed near the pivot axis 1500 to make sure the foldable packing device 1400 is at the first position. If the foldable packing device 1400 is not at the first position exactly, the optical scanner won't start to scan. If the foldable packing device 1400 is folded during the scanning operation, the optical scanner will stop scanning.

Similarly, the optical system 1100 of the optical scanner of the present invention has a light source 1110, a reflection mirror set 1120, a image-formation set 1130, and an optical sensor 1140, wherein the optical sensor of the present invention is CCD. While performing scanning, light from the light source 1110 is incident onto a document 1300 putting on a light transmissible plate 1200 to obtain an image light 1310 by reflection or transmission. The reflection mirror set 1120 comprises several reflection mirrors 1121, 1122, 1123, and 1124 and is located in an optical path of the image light 1310. The image light 1310 of document 1300 on the light transmissible plate 1200 is directed to the reflection mirror set 1120 and reflected to the image-formation set 1130 by the reflection mirror set 1120. The image-formation set 1130 can receive the image light 1310 of the document 1300 transmitted by the reflection mirror set 1120 and display the image light 1310 on the charge couple device 1140. The above-mentioned is the optical path of the image light 1310 of the document 1300 transmitting in the optical system 1100 of the optical scanner.

As shown in FIG. 3a, the image-formation set and the CCD 1140 are deposed in the interior of the foldable packing device 1400. While the foldable packing device 1400 is at the first position, the optical path of the image light 1310 will be directed into the interior of the foldable packing device 1400 through the image-formation set 1130 to the CCD 1140, and while the foldable packing device 1400 is at the second position, the image-formation set 1130 and the optical sensor 1140 diverge from the optical path of the image light 1310. In another word, the structure of foldable optical path of the present invention is able to fold the later half of the optical path for the convenience of the mechanical design, and make the optical scanner more compact for the convenience of carrying or storage.

In the optical system of conventional optical scanner, the whole optical system moves together during the scanning operation, but in the present invention, only reflection mirror set 1120 (such as three reflection mirrors 1121,1122, and 1123 in this embodiment) and light source 1110 are moving during the scanning operation as shown in FIG. 3a. In order to avoid the distance between the reflection mirror set 1120 and the image-formation set 1130 (in this case shown in FIG. 3a, the distance is between the mirror 1123 and 1124) being changed (larger) during the scanning operation thus cause the image light 1310 can't display on the CCD 1140 through the image-formation set 1130, the present invention utilize a movable reflection mirror set. That is, the distances between each reflection mirror 1121,1122,1123, and 1124 are adjustable, thus the present is able to fix the length of the optical path of the image light 1310 from the document 1300 through the reflection mirror set 1120 to the image-formation set 1130.

Figure 4A:
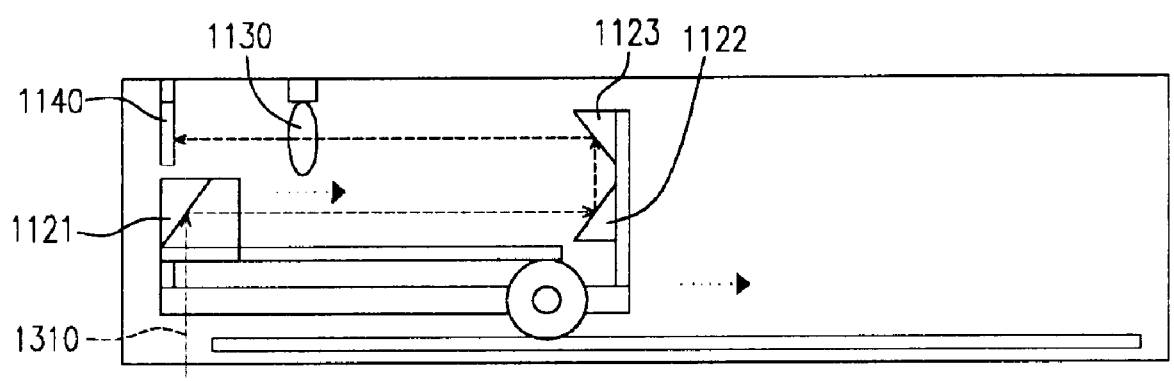
FIGS. 4a through 4c are cross-sectional views of the continuous motion of the reflection mirror set during the scanning operation according to a embodiment of this invention.
Figure 4B:
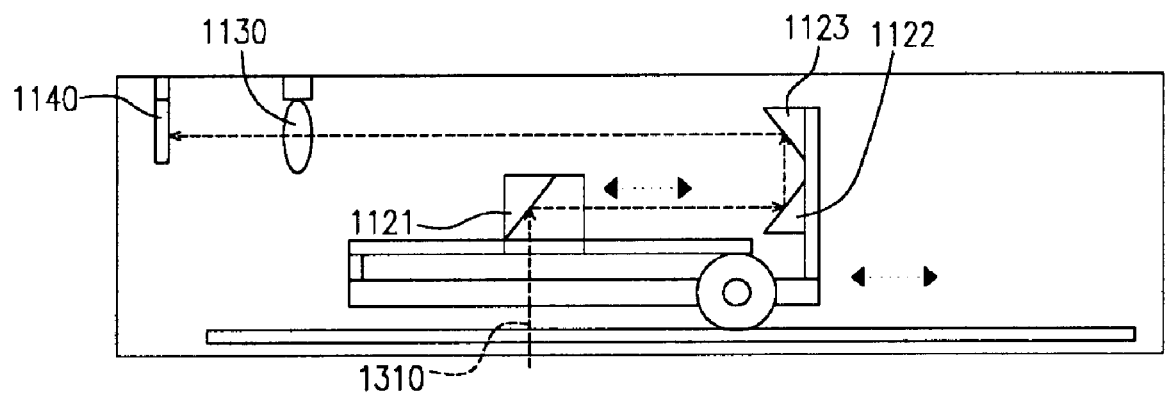
Figure 4C:
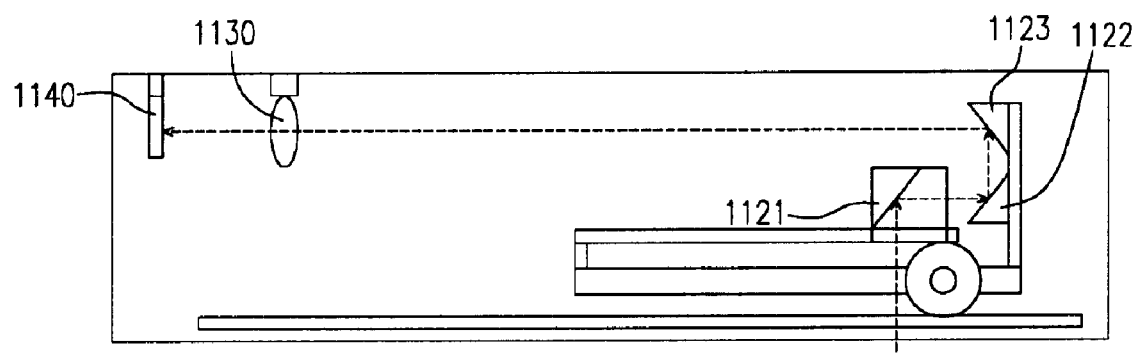

FIGS. 4a~4c illustrate the continuous motion of the movable reflection mirror set. The whole reflection mirror set is moving toward right and far away from the image-formation set 1130 during the scanning operation. In the mean time, the reflection mirror 1121 is moving close to the reflection mirror 1122, thus the length of the optical path of the image light from the document through the reflection mirror set to the image-formation set is able to be fixed. The motion of the movable reflection mirror set can be controlled by a CPU. The optical scanner further concludes a transmission member 1900 connecting to the reflection mirror set 1120. The transmission member 1900 can drive the reflection mirror set 1120 moving in the interior of the main frame 1900. Moreover, the transmission member 1900 may conclude a motor and transmission devices such as a transmission gear set and a belt.

Furthermore, because the later half of the optical path may be not in the correct position when folding or opening the foldable packing device every time, the present further provides a calibration chart 1700 on one end of the light transmissible plate 1200 where the optical system 1100 initial to scan the document 1300. Every time when the optical scanner connects to a PC or turns on its power, it will scan the calibration chart 1700 first to get arguments and compensate the deviating in left or right, the shift in front and rear, or the magnification. Moreover, while the optical scanner is power on, if the switch 1600 detects that the foldable packing device 1400 is folded and reopened, the CPU will command the scanner rescan the calibration chart 1700 to renew the arguments.

Figure 5A:
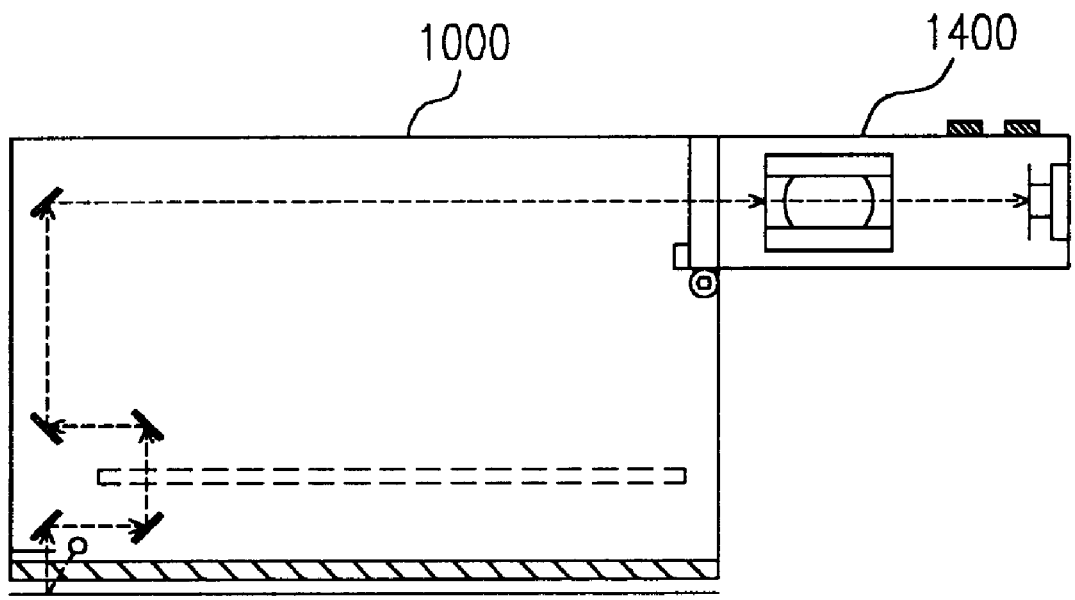
FIG. 5a is a cross-sectional view of the structure of foldable optical path while the scanner in a scanning operation according to another embodiment of this invention.
Figure 5B:
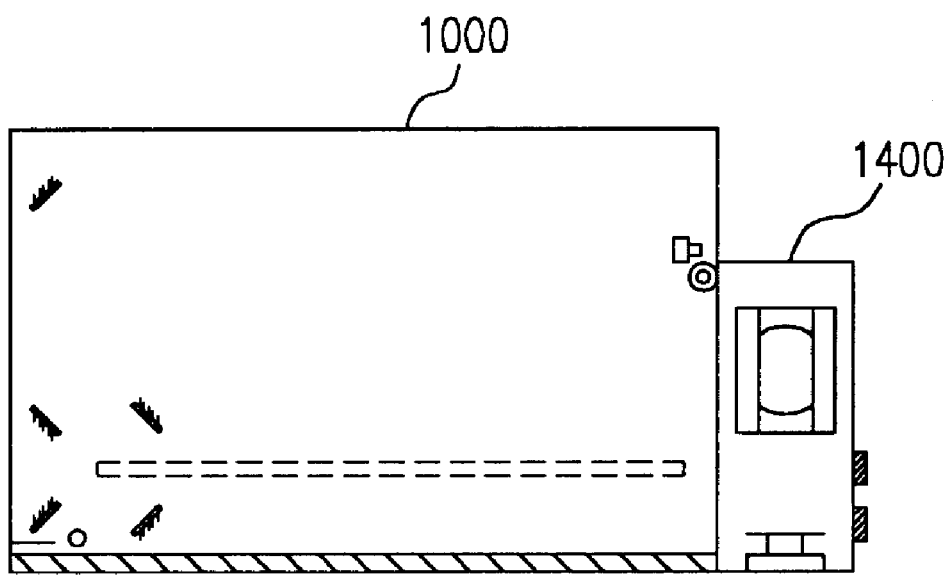
FIG. 5b is a cross-sectional view of the structure of foldable optical path while the foldable packing device is folded according to another embodiment of this invention.
Figure 6A:
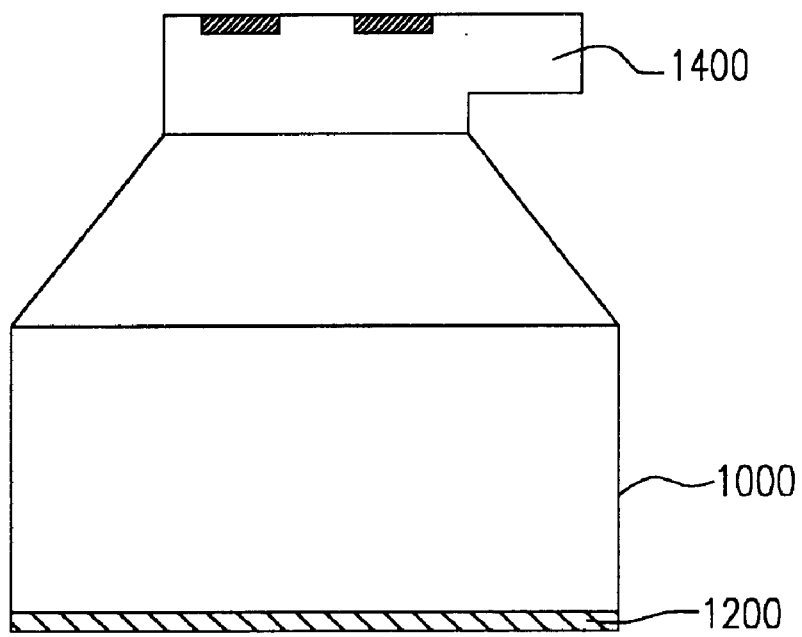
FIG. 6a is a cross-sectional view of the structure of foldable optical path while the scanner in a scanning operation according to the other embodiment of this invention.
Figure 6B:
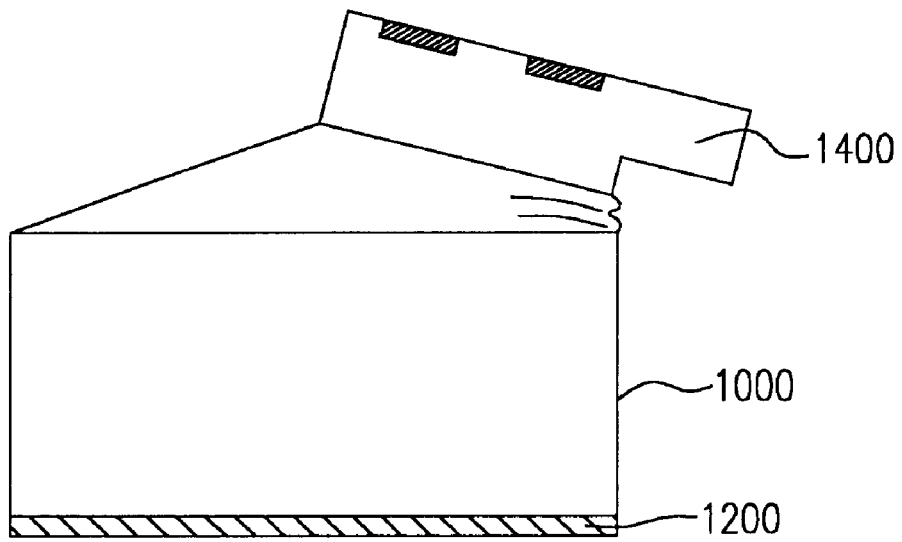
FIG. 6b is a cross-sectional view of the structure of foldable optical path while the foldable packing device is folded according to the other embodiment of this invention.

The formation of the foldable packing device 1400 is not limited to be deposed on the left top side of the main frame 1000 and folded toward right as shown in FIGS. 3a and 3b. The foldable packing device 1400 can be deposed on any place of the main frame 1000 and folded toward any direction. For example, as shown in FIGS. 5a and 5b, the foldable packing device 1400 is deposed at right side of the main frame 1000 and folded downward; or as shown in FIGS. 6a and 6b, the foldable packing device 1400 is deposed on top of the main frame 1000 and folded downward directly, wherein the material of the cover of the connection portion between the foldable packing device 1400 and the main frame 1000 is soft and able to change its shape.

Consequently, it will be apparent to those skilled in the art that various modifications and variations can be made to the formation of the foldable packing device of the present invention without departing from the scope or spirit of the invention.

In conclusion, major advantages of this invention include:

1. providing a foldable packing device for the convenience of carrying and operation, a user don't have to push the scanner to proceed the scanning operation.

2. deposing part of the optical path in the interior of the foldable packing device, and the foldable packing device is able to be folded to reduce the cost of the package and storage.

3. utilizing of a CCD that collocates with a normal image-formation set to get a better depth of field.

4. deposing a switch near the pivot axis to detect the position of the foldable packing device and prevent the foldable packing device from being folded during the scanning operation or check whether the foldable is at the right position or not.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A foldable structure for folding an optical path, suitable for use in an optical scanner, the optical scanner at least having a main frame, a light transmissible plate, a light source, a reflection mirror set, an image-formation set, and an optical sensor, wherein the light source illuminates a document to get an image light, the reflection mirror set is arranged in an optical path of the image light to project the image light to the optical sensor, the image-formation set is arranged in the optical path between the reflection mirror set and the optical sensor, the document contacts with the light transmissible plate, the folding structure comprising:

a foldable packing device coupled to the main frame, and the foldable packing device being able to rotate from a first position, at which the scanner is during a scanning operation, to a second position, at which the foldable packing device is folded, via a pivot axis, wherein the image-formation set and the optical sensor are disposed in the interior of the foldable packing device, wherein when the foldable packing device is at the first position, the optical path of the image light can enter into an interior of the foldable packing device and is projected by the image-formation set onto the optical sensor, and when the foldable packing device is at the second position, the image-formation set and the optical sensor are deviated from the optical path of the image light.

2. The structure of foldable optical path of claim 1, wherein the reflection mirror set has a plurality of reflection mirrors, the reflection mirror set is able to move in the interior of the main frame during the scanning operation, and distances between the reflection mirrors are adjustable, so that a distance from the document to the image-formation set is able to be fixed.

3. The structure of foldable optical path of claim 2, further includes a transmission member connecting to the reflection mirror set and drives the reflection mirror set moving in the interior of the main frame.

4. The structure of foldable optical path of claim 1, wherein the reflection mirror set and the image-formation set is able to move in the interior of the main frame during the scanning operation, thus the distance between the reflection mirror set and the image-formation set and the distance between the optical sensor and the image-formation set are adjustable in order to maintain a same magnification of the image light through the image-formation set to the optical sensor.

5. The structure of foldable optical path of claim 4, further including a transmission member connecting to the reflection mirror set and the image-formation set, and drives the reflection mirror set and the image-formation set moving in the interior of the main frame separately.

6. The structure of foldable optical path of claim 1, wherein the optical sensor is charge couple device.

7. The structure of foldable optical path of claim 1, further including a switch disposing near the pivot axis used to detect whether the foldable packing device is at the first position or not.

8. The structure of foldable optical path of claim 1, further including a plurality of function keys disposing on the foldable packing device.

9. The structure of foldable optical path of claim 1, further including a calibration chart that disposing on the light transmissible plate used to calibrate the optical scanner while power is on.

10. An optical scanner suitable for use in scanning a document comprising:

a main frame having a light transmissible plate, wherein the document contacts with the light transmissible plate;

a foldable packing device coupled to the main frame, and the foldable packing device capable of rotating from a first position, at which the scanner is during a scanning operation, to a second position, at which the foldable packing device is folded, via a pivot axis;

a light source, disposing in an interior of the main frame and illuminating the document to get an image light, the image light having an optical path;

a reflection mirror set disposing in the optical path and in the interior of the main frame, the reflection mirror set reflects the image light;

an optical sensor, disposing in an interior of the foldable packing device, wherein when the foldable packing device is at the first position, the optical path of the image light will be directed into the interior of the foldable packing device to the optical sensor, while the foldable packing device is at the second position, the optical sensor diverges from the optical path of the image light; and a image-formation set disposing in the interior of the foldable packing device, while the foldable packing device is at the first position, the optical path of the image light can enter an interior of the foldable packing device, and is projected by the image-formation set onto the optical sensor, and when the foldable packing device is at the second position, the image-formation set are deviated from the optical path of the image light.

11. The optical scanner of claim 10, wherein the reflection mirror set has a plurality of reflection mirrors, the reflection mirror set is able to move in the interior of the main frame during the scanning operation, and distances between the reflection mirrors are adjustable, thus a distance from the document to the image-formation set is able to be fixed.

12. The optical scanner of claim 11, further includes a transmission member connecting to the reflection mirror set and drives the reflection mirror set moving in the interior of the main frame.

13. The optical scanner of claim 10, wherein the reflection mirror set and the image-formation set is able to move in the interior of the main frame during the scanning operation, thus the distance between the reflection mirror set and the image-formation set and the distance between the optical sensor and the image-formation set are adjustable in order to maintain a same magnification of the image light through the image-formation set to the optical sensor.

14. The optical scanner of claim 13, further including a transmission member connecting to the reflection mirror set and the image-formation set, and drives the reflection mirror set and the image-formation set moving in the interior of the main frame separately.

15. The optical scanner of claim 10, wherein the optical sensor includes a charge couple device.

16. The optical scanner of claim 10, further including a switch disposing near the pivot axis used to detect whether the foldable packing device is at the first position or not.

17. The optical scanner of claim 10, further including a plurality of function keys disposing on the foldable packing device.

18. The optical scanner of claim 10, further including a calibration chart that is disposed on the light transmissible plate used to calibrate the optical scanner when power is on.

* * * * *